United States Patent [19]
(12) United States Patent  
Matsuo et al.

(10) Patent No.: US 8,817,628 B2  
(45) Date of Patent: Aug. 26, 2014

(54) WIRELESS SYSTEM

(75) Inventors: Ryoko Matsuo, Tokyo (JP); Tomoya Tandai, Kawasaki (JP); Takeshi Tomizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 13/416,143

(22) Filed: Mar. 9, 2012

(65) Prior Publication Data

US 2012/0170568 A1    Jul. 5, 2012

Related U.S. Application Data

(63) Continuation of application No. PCT/JP2009/004508, filed on Sep. 10, 2009.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ........... 370/236; 370/235; 370/345; 370/442; 370/443; 370/444

(58) Field of Classification Search
CPC .......... H04W 28/02–28/021; H04W 28/0252; H04W 28/10–28/12; H04W 72/04–72/0433; H04W 72/12; H04W 72/1278–72/1314; H04W 74/002–74/006; H04W 74/085; H04W 74/0866–74/0891; H04W 76/04–76/048; H04W 76/066
USPC .............. 370/229–231, 235, 236–236.2, 252, 370/280, 294, 345–350, 442–444, 465, 468, 370/498, 522; 709/207, 225–226
See application file for complete search history.

(56) References Cited

U.S. PATENT DOCUMENTS

| | | | |
|---|---|---|---|
| 2007/0115853 A1* | 5/2007 | Wentink | 370/252 |
| 2008/0095089 A1* | 4/2008 | Nishiyama et al. | 370/311 |
| 2010/0142493 A1* | 6/2010 | Sakoda et al. | 370/336 |

FOREIGN PATENT DOCUMENTS

| | | |
|---|---|---|
| JP | 06-291748 A | 10/1994 |
| JP | 2008-079045 A | 4/2008 |

OTHER PUBLICATIONS

International Search Report dated Mar. 2, 2010 issued in International Appln. No. PCT/JP2009/004508.
Japanese Office Action dated May 16, 2014 issued in counterpart Japanese Application No. 2013-235455.

\* cited by examiner

*Primary Examiner* — Awet Haile
*Assistant Examiner* — Eric Myers
(74) *Attorney, Agent, or Firm* — Holtz Holtz Goodman & Chick PC

(57) ABSTRACT

In a wireless system of one embodiment, a first wireless device includes: a first transmitter which transmits an end-of-transmission notification; and a first receiver which receives a change request signal sent from a second wireless device receiving the end-of-transmission notification. The second wireless device includes: a second receiver which receives the end-of-transmission notification; and a second transmitter which transmits a change request signal when the end-of-transmission notification is received. The first transmitter transmits a signal at a longer interval after the first receiver receives the change request signal, and the second transmitter transmits a signal at a shorter interval after the second transmitter transmits the change request signal.

12 Claims, 16 Drawing Sheets

WIRELESS SYSTEM

CROSS-REFERENCE TO RELATED APPLICATION(S)

This is a Continuation Application of PCT Application No. PCT/JP09/004508, filed on Sep. 10, 2009, which was published under PCT Article 21(2) in Japanese, the entire contents of which are incorporated herein by reference.

FIELD

Embodiments described herein relate generally to a wireless system.

BACKGROUND

There is a mechanism based on one-to-one connection, in which random back-off is performed during transmission of a control signal until connection is established and transmission/reception is performed at intervals of a fixed period (e.g. SIFS (short interframe space), DIFS (distributed interframe space), etc. in a wireless LAN based on IEEE802.11) without the back-off after the connection is established. In that case, there is proposed a method in which fixed periods given to a connection request transmitting wireless device (hereinafter designated by Initiator) and a connection request receiving wireless device (hereinafter designated by Responder) respectively are changed to Initiator IFS (Initiator interframe space (IIFS)) for the Initiator and Responder IFS (Responder interframe space (RIFS)) for the Responder so as to set IIFS<RIFS to thereby give priority to the Initiator while avoiding collision between the Initiator and the Responder. When a shorter signal transmission interval is given to the Initiator than to the Responder, a chance of signal transmission can be preferentially given to the Initiator to prevent necessity of random back-off during signal transmission and reception. Thus, efficiency of communication can be improved.

In the aforementioned method, it is difficult for the Responder to gain a transmission chance even if there are a larger number of transmission signals on the Responder side. In addition, the transmission signal interval in the Responder is longer than that in the Initiator. Accordingly, even if the Responder has gained the transmission chance, there is a problem that efficiency of communication is lowered by about several %, compared with the case where the Initiator mainly transmits signals.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

In general, one embodiment provides a wireless system including: a first wireless device which transmits a first signal at one of a first interval and a second interval, the second interval being longer than the first interval, and a second wireless device which transmits a second signal at the other of the first interval and the second interval, wherein the first wireless device includes: a first determinator which determines whether or not to transmit an end-of-transmission notification, the end-of-transmission notification indicating that transmission data to be transmitted to the second wireless device does not exist; a first transmitter which transmits the end-of-transmission notification when the first determinator determines that the end-of-transmission notification is to be transmitted; and a first receiver which receives a change request signal sent from the second wireless device receiving the end-of-transmission notification, the change request signal requesting to change a transmission interval of the first wireless device from the first interval to the second interval, wherein the second wireless device includes: a second determinator which determines whether or not to transmit the change request signal; a second receiver which receives the end-of-transmission notification; and a second transmitter which transmits the change request signal when the end-of-transmission notification is received and the second determinator determines that the change request signal is to be transmitted, wherein the first transmitter transmits the first signal at the second interval after the first receiver receives the change request signal, and wherein the second transmitter transmits the second signal at the first interval after the second transmitter transmits the change request signal.

Embodiments will be described below with reference to the drawings. In the embodiments, parts referred to by the same numerals are regarded as parts making similar operations, and duplicate description thereof will be omitted.

Figure 1:
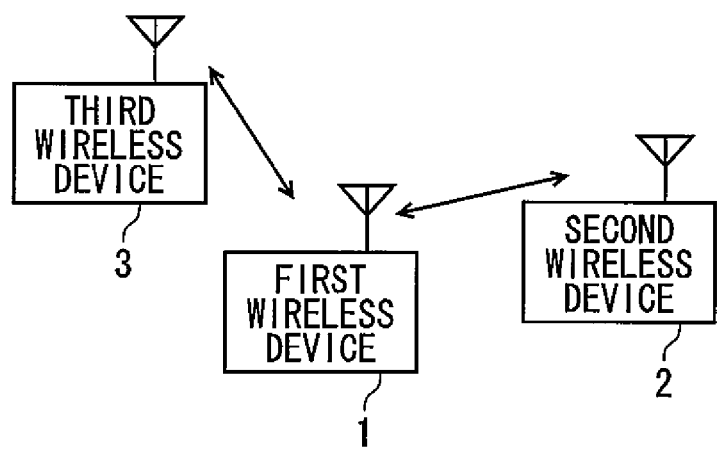
FIG. 1 is a schematic view showing a wireless system.

First, the outline of a wireless system for the embodiments will be described with reference to FIG. 1. The wireless system in FIG. 1 has first to third wireless devices 1 to 3. Assume that a communication range of each wireless device in the wireless system is set to be wide up to about several tens of cm. When the communication range of the wireless device is for near field communication up to several tens of cm like this, several wireless devices at most can be connected to one wireless device. In the example of FIG. 1, the number of wireless devices provided in the wireless system is 3. However, the number of wireless devices is not limited thereto but may be about 2 to 5. In the example of FIG. 1, the first wireless device 1 and the second wireless device 2 are engaging in wireless communication. In addition, the first wireless device 1 and the third wireless device 3 are engaging in wireless communication. Although the following description will be made on wireless communication between the first wireless device 1 and the second wireless device 2, the same thing may be applied to wireless communication between the first and third wireless devices 1 and 3 or wireless communication between the second and third wireless devices 2 and 3.

The wireless system performs communication as follows in order to make connection simpler and more efficient than that in a method in which a broadcast signal (e.g. a Beacon signal) is transmitted by one wireless device serving as an access point and random back-off control is performed whenever each wireless device performs transmission.

First, for the sake of signal transmission, a control signal between wireless devices for starting connection, such as a connection request signal (Connection Request), is transmitted/received, for example, using the random back-off control. After the connection is established, a shorter signal transmission interval is given to an Initiator than to a Responder to give a signal transmission chance to the Initiator preferentially while avoiding collision between the Initiator and the Responder without the random back-off control.

The communication efficiency during the Responder's transmission is lowered in the aforementioned method. Therefore, a method for improving the communication efficiency may be considered as follows.

Figure 2:
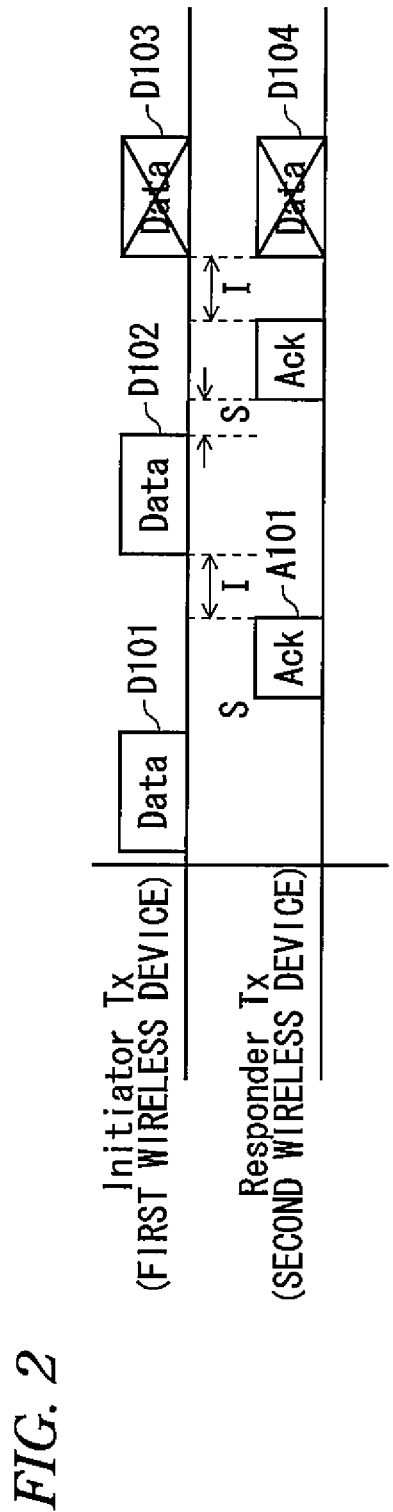
FIG. 2 is a view showing an example of packet exchange between a first wireless device and a second wireless device.

FIG. 2 shows an example in which packets are exchanged using one method for improving the Responder's efficiency. When the first wireless device 1 in FIG. 1 transmits a connection request signal to the second wireless device 2 and the second wireless device 2 receives the connection request signal, connection between the first and second wireless devices 1 and 2 is established with the first wireless device 1 serving as the Initiator and the second wireless device 2 serving as the Responder. FIG. 2 shows that the first and second wireless devices 1 and 2 exchange packets after establishing the connection.

After the connection has been established, the first wireless device 1 transmits data D101 to the second wireless device 2. On receiving the data D101, the second wireless device 2 transmits a signal (an Ack signal A101) including data arrival confirmation information to the first wireless device 1 at a transmission interval RIFS (indicated as S in FIG. 2). The first wireless device 1 which has received the Ack signal A101 transmits next data D102 at a transmission interval IIFS (indicated as I in FIG. 2) after receiving the Ack signal A101. Even if the second wireless device 2 has data to transmit to the first wireless device 1, the second wireless device 2 cannot transmit the data. Since the transmission interval set for the second wireless device 2 is RIFS (IIFS<RIFS), the first wireless device 1 can transmit the data D102 before the second wireless device 2 transmits the data.

In this case, when the second wireless device 2 has data to transmit, there may be considered a method in which the transmission interval is changed from RIFS to IIFS to allow the second wireless device 2 to perform the transmission. However, the first wireless device 1 may also have data to transmit. In this case, both the first and second wireless devices 1 and 2 have the transmission interval IIFS, causing collision in data transmission (D103 and D104 in FIG. 2).

Another method for improving the Responder's efficiency will be described with reference to FIG. 3. The procedure in which connection is established and the first wireless device 1 transmits data at the transmission interval IIFS is the same as that in the method of FIG. 2. In this method, when the transmission interval is intended to be changed from RIFS to IIFS, a signal (change request notification) indicating the intention to change the transmission interval is transmitted.

The first wireless device 1 transmits data D201 at the transmission interval IIFS. When, for example, the second wireless device 2 has data to transmit, the second wireless device 2 adds a change request notification to an Ack signal A201 corresponding to the data D201 and transmits the Ack signal A201. After the second wireless device 2 has transmitted the Ack signal A201, the second wireless device 2 waits for just IIFS and then transmits data D202. On receiving the change request notification, the first wireless device 1 receiving the change request notification changes the transmission interval from IIFS to RIFS. Due to IIFS<RIFS, the second wireless device 2 transmits the data D202 before the first wireless device 1 transmits data so that collision in transmission between the first wireless device 1 and the second wireless device 2 can be prevented.

When the first wireless device 1 also has data to transmit, it may be difficult for the first wireless device 1 to gain a signal transmission chance if the transmission interval of the first wireless device 1 is RIFS. Therefore, when the first wireless device 1 also has data to transmit, the first wireless device 1 transmits a change request notification for requesting change from RIFS to IIFS. In FIG. 3, the first wireless device 1 adds the change request notification to an Ack signal A202 corresponding to the data D202, transmits the Ack signal A202, and transmits data D203 at a transmission interval IIFS. When both the first and second wireless devices 1 and 2 have data to transmit in this manner, changeover between transmission at IIFS and transmission at RIFS may occur frequently due to a scramble for the right of transmission at IIFS.

Embodiment 1

A wireless system according to Embodiment 1 will be described. The outline of the wireless system according to Embodiment 1 is the same as the wireless system shown in FIG. 1. The wireless system according to Embodiment 1 has a first wireless device 11 and a second wireless device 21.

Figure 3:
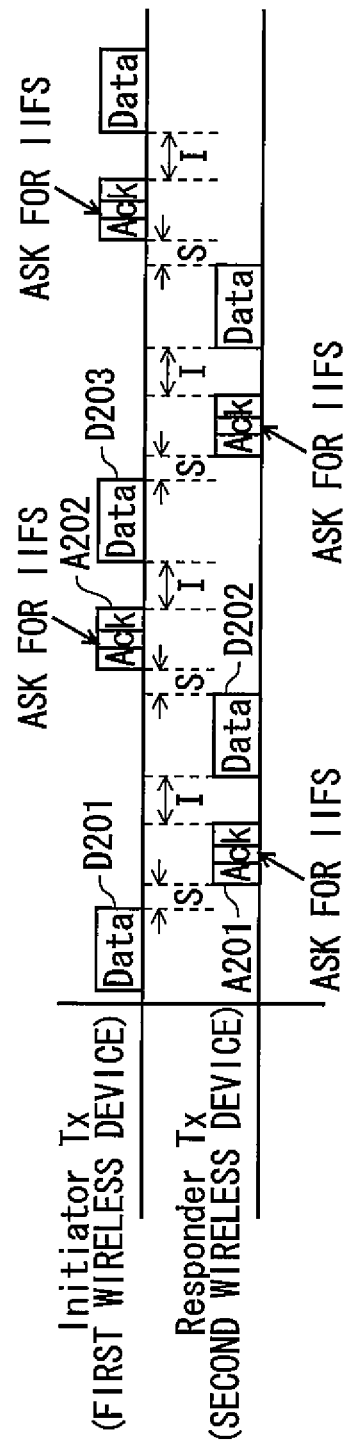
FIG. 3 is a view showing another example of packet exchange between the first wireless device and the second wireless device.

A part of a transmission procedure of the wireless system according to Embodiment 1, that is, a procedure in which connection is established and the first wireless device 11 transmits data at a transmission interval IIFS is the same as that in the method of FIGS. 2 and 3, and description thereof will be therefore omitted. In the wireless system according to Embodiment 1, when the first wireless device 11 which is an Initiator has no data to transmit, the transmission interval of the second wireless device 21 which is a Responder is changed from RIFS to IIFS so as to improve efficiency of Responder's signal transmission while securing Initiator's preferential transmission.

Figure 4:
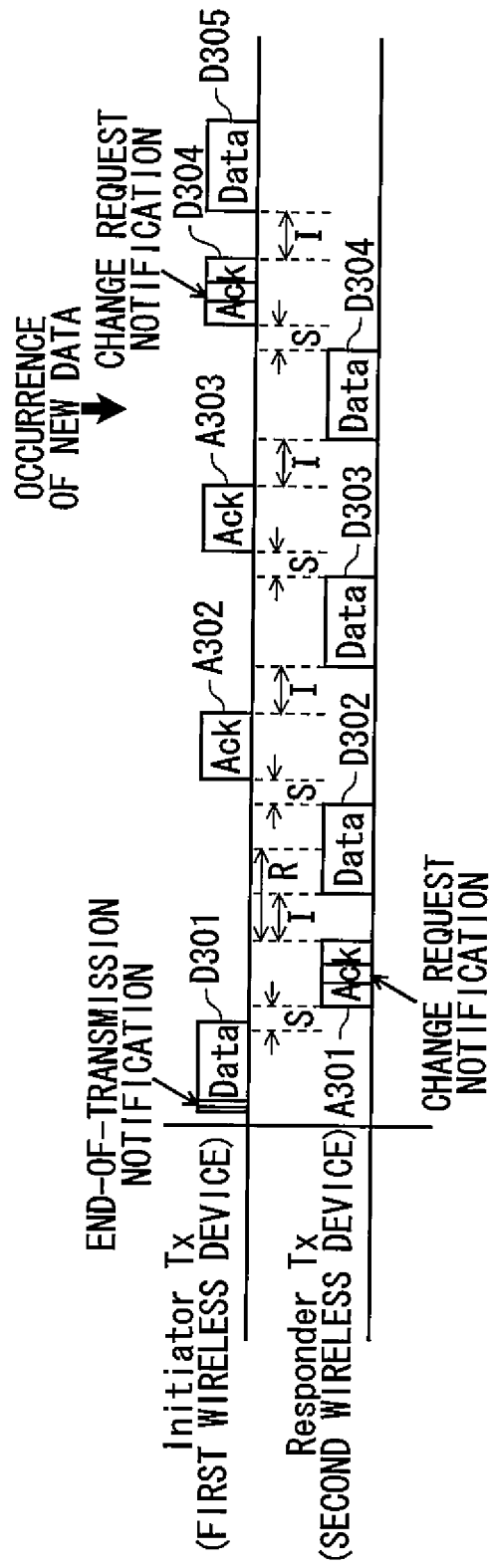
FIG. 4 is a view showing an example of packet exchange of a wireless system according to Embodiment 1.

Specifically, when necessity for data transmission is low, for example, when the transmission queue is empty, the first wireless device 11 determines that there is no data to transmit, and sends an end-of-transmission notification. In FIG. 4 which will be described later, a command for an end-of-transmission notification is added to data which is previous to the determination that there is no data to transmit, i.e. data which is transmitted last, and the data added with the command is transmitted. However, the end-of-transmission notification may be transmitted as another signal than the data. When the data with the end-of-transmission notification is transmitted, for example, the end-of-transmission notification may be expressed by "1, 0" using one bit in the header of a transmission signal obtained by applying signal processing etc. to the transmission data which is transmitted last.

When the first or second wireless device 1 or 2 intends to change the transmission interval from RIFS to IIFS, the first or second wireless device 1 or 2 transmits a change request notification in the same manner as in FIG. 3. In FIG. 4, the change request notification is added to the Ack signal and then transmitted. However, the change request notification may be transmitted as another signal than the Ack signal. When the change request notification is added to the Ack signal, the change request notification may be expressed by "1, 0" using one bit in the Ack signal.

An example of packet exchange will be described in detail with reference to FIG. 4.

When the number of data stored in the transmission queue is one, the first wireless device 11 adds an end-of-transmission notification to the stored data and transmits the data as one transmission data D301 to the second wireless device 21.

The second wireless device 21 receives the data D301 including the end-of-transmission notification. As long as the second wireless device 21 has data to transmit on this occasion, the second wireless device 21 adds a change request notification to an Ack signal A301 corresponding to the data and transmits the Ack signal A301. The second wireless device 21 determines whether to change the transmission interval of the second wireless device 21 from RIFS to IIFS or not, for example, based on the condition of the transmission queue or the condition of the available time of the channel. When, for example, data is stored in the transmission queue, the second wireless device 21 concludes that the second wireless device 21 has data to transmit and should change the transmission interval. In addition, when the available time of the channel is too short so that it is difficult for the second wireless device 21 to obtain a chance of signal transmission at a transmission interval RIFS in spite of the existence of data to transmit, the second wireless device 21 may conclude that the second wireless device 21 has to change the transmission interval.

After transmitting the Ack signal A301 including the change request notification, the second wireless device 21 starts transmitting data at an interval IIFS (data D302 to D304).

On the other hand, when the first wireless device 11 receives the Ack signal A301 including the change request notification after transmitting the data D301 including the end-of-transmission notification, the first wireless device 11 changes the transmission interval from IIFS to RIFS.

Here, consider the case where data to transmit occurs in the first wireless device 11 when the transmission interval of the first wireless device 11 is RIFS. The data to transmit occurs when, for example, a processing portion in a higher-level layer notifies the first wireless device 11 of new data.

In this case, the first wireless device 11 transmits a second change request notification at a next timing of transmitting a signal to the second wireless device 21, regardless of the transmission condition of the second wireless device 21. In FIG. 4, the first wireless device 11 transmits the second change request notification added to an Ack signal A304 corresponding to data D304. On transmitting the second change request notification, the first wireless device 11 changes the transmission interval from RIFS to IIFS. The first wireless device 11 transmits data D305 at an interval IIFS after transmitting the Ack signal A304 including the second change request notification.

When the second wireless device 21 whose transmission interval has been set at IIFS receives the second change request notification from the first wireless device 11, the second wireless device 21 changes the transmission interval from IIFS to RIFS in spite of existence of data to transmit.

Figure 5:
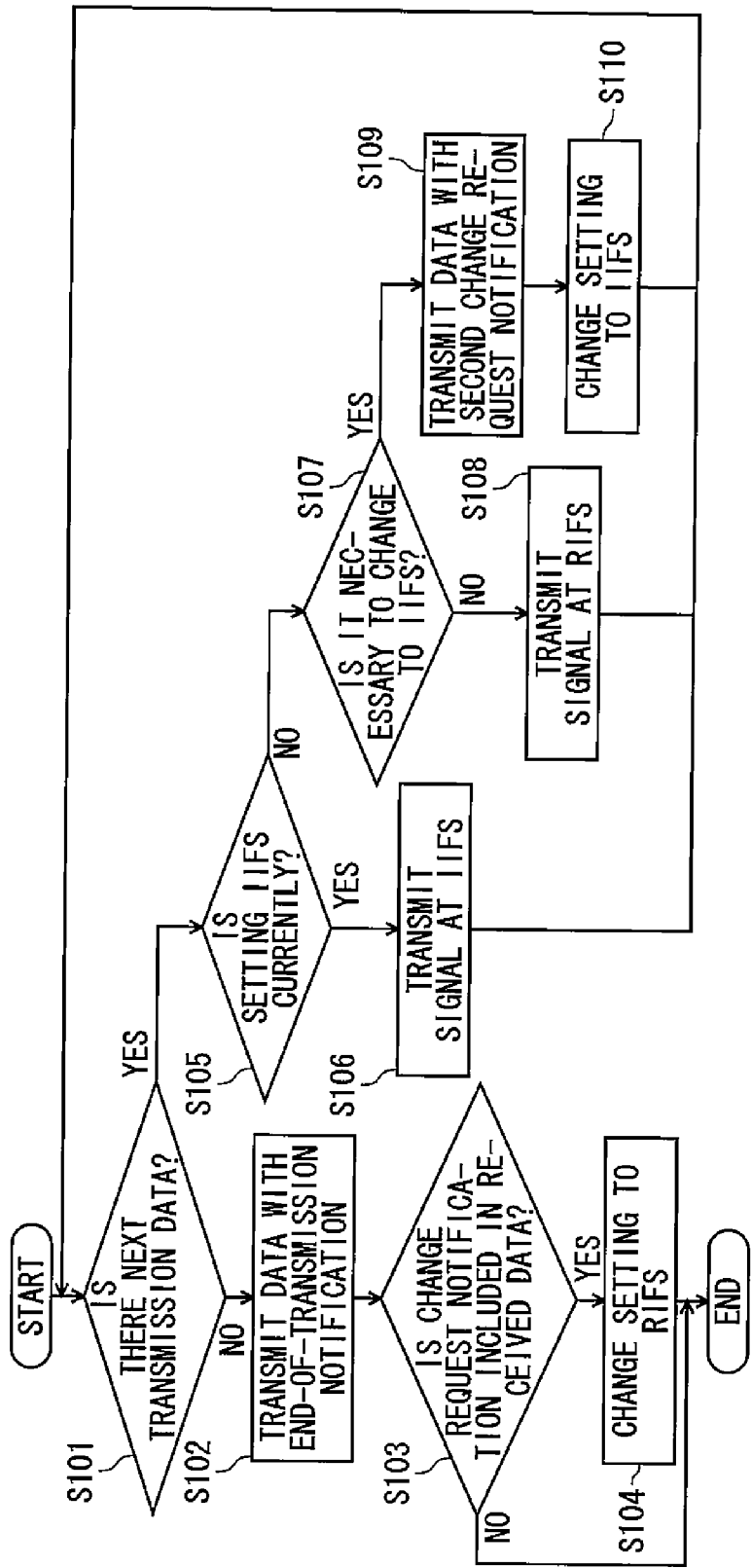
FIG. 5 is a chart showing a processing flow of a first wireless device 11 according to Embodiment 1.

FIG. 5 shows a flow of data transmission processing in the first wireless device 11. First, the first wireless device 11 determines whether there is data to transmit next to transmission data to transmit in this processing or not (S101). When there is no data to transmit next (no in S101), the first wireless device 11 adds an end-of-transmission notification to the transmission data and transmits the transmission data (S102). After that, the first wireless device 11 determines whether data (for example, an Ack signal) including a change request notification has been received from the second wireless device 21 or not (S103). When the change request notification has been received (Yes in S103), the first wireless device 11 changes the transmission interval from IIFS to RIFS (S104). When no change request notification is included in received data (No in S103), the first wireless device 11 terminates the processing.

When concluding in S101 that there is data to transmit next (Yes in S101), the first wireless device 11 determines whether the transmission interval is IIFS or not (S105). When the transmission interval is IIFS (Yes in S105), the first wireless device 11 transmits a transmission signal at a transmission interval IIFS (S106), and returns to S101. When the transmission interval is not IIFS but RIFS (No in S105), the first wireless device 11 determines whether to change the transmission interval from RIFS to IIFS or not (S107). Whether to change the transmission interval or not is determined based on the condition of the transmission queue or the condition of the availability of the channel in the same manner as the aforementioned criteria with which the second wireless device 21 determines whether to transmit a change request notification or not.

When the transmission interval may remain to be RIFS (No in S107), the first wireless device 11 transmits a transmission signal at the transmission interval RIFS (S108) and returns to S101.

When the transmission interval has to be changed from RIFS to IIFS (Yes in S107), the first wireless device 11 adds a second change request notification to transmission data and transmits the transmission data to the second wireless device 21 (S109). The transmission data may be an Ack signal. After transmitting the second change request notification, the first wireless device 11 changes the transmission interval from RIFS to IIFS (S110), transmits data (S111) and returns to S101.

Figure 6:
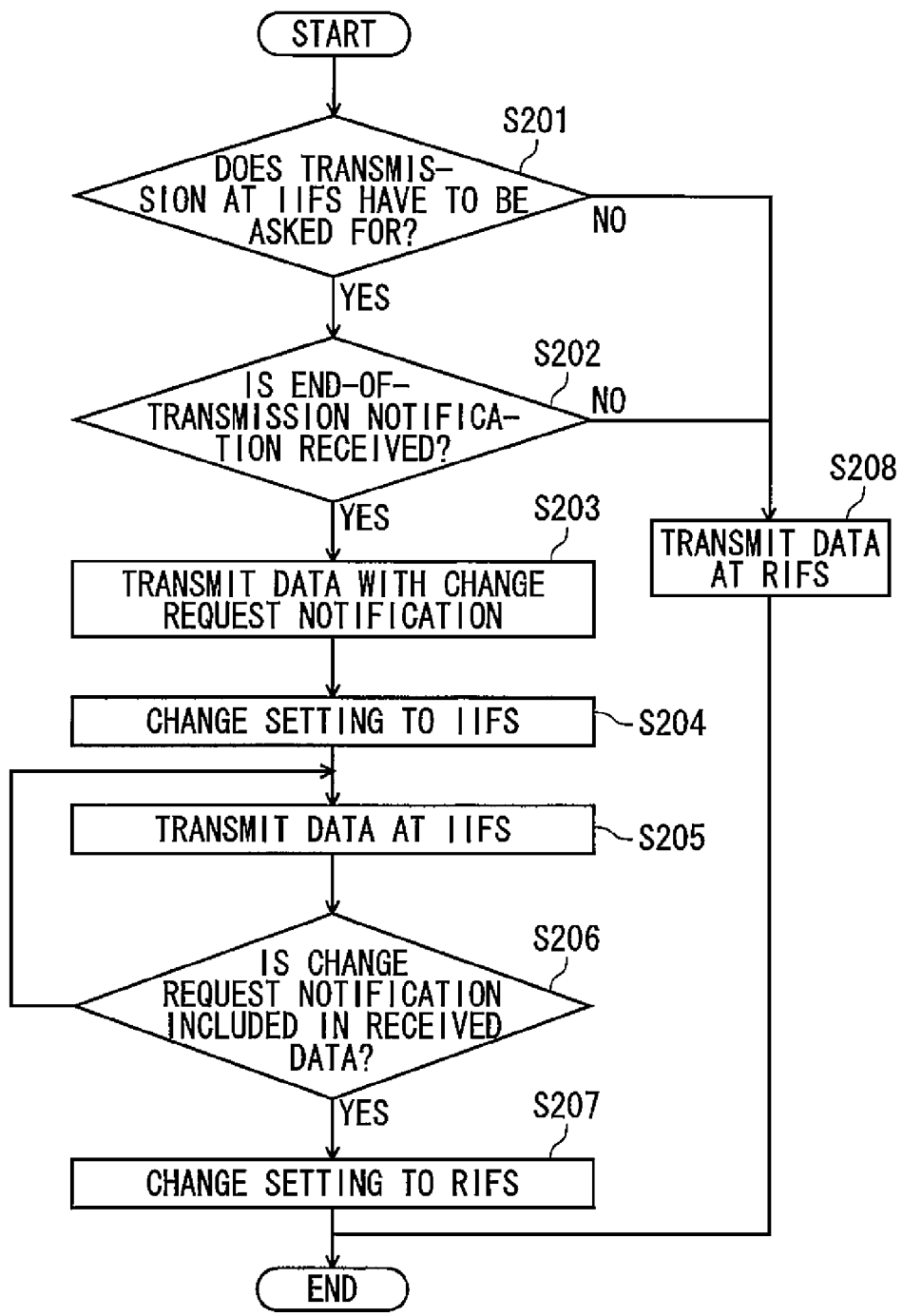
FIG. 6 is a chart showing a processing flow of a second wireless device 21 according to Embodiment 1.

FIG. 6 shows a flow of data transmission processing in the second wireless device 21. First the second wireless device 21 determines whether to change the transmission interval from RIFS to IIFS or not (S201). When the transmission interval does not have to be changed (No in S201), the second wireless device 21 transmits a transmission signal at the transmission interval RIFS (S208).

When concluding that the transmission interval has to be changed (Yes in S201), the second wireless device 21 waits for reception of an end-of-transmission notification sent from the first wireless device 11. That is, the second wireless device 21 determines whether the end-of-transmission notification has been received or not (S202). When the end-of-transmission notification has not been received (No in S202), the second wireless device 21 tries to transmit data at the transmission interval RIFS (S208). On the contrary, when the second wireless device 21 has received the end-of-transmission notification (Yes in S202), the second wireless device 21 transmits a change request notification (S203). In the case of FIG. 4, the second wireless device 21 adds the change request notification to an Ack signal and transmits the Ack signal.

On transmitting the change request notification, the second wireless device 21 changes the transmission interval from RIFS to IIFS (S204) and transmits data at the transmission interval IIFS (S205).

While transmitting transmission data at the transmission interval IIFS, the second wireless device 21 determines whether data including a second change request notification has been transmitted from the first wireless device 11 or not (S206). When data including the second change request notification has not been received from the first wireless device 11 (No in S206), the second wireless device 21 returns to S205 to transmit data at the transmission interval IIFS. When the second change request notification has been received from the first wireless device 11 (Yes in S206), the second wireless device 21 changes the transmission interval from IIFS to RIFS (S207).

Figure 7:
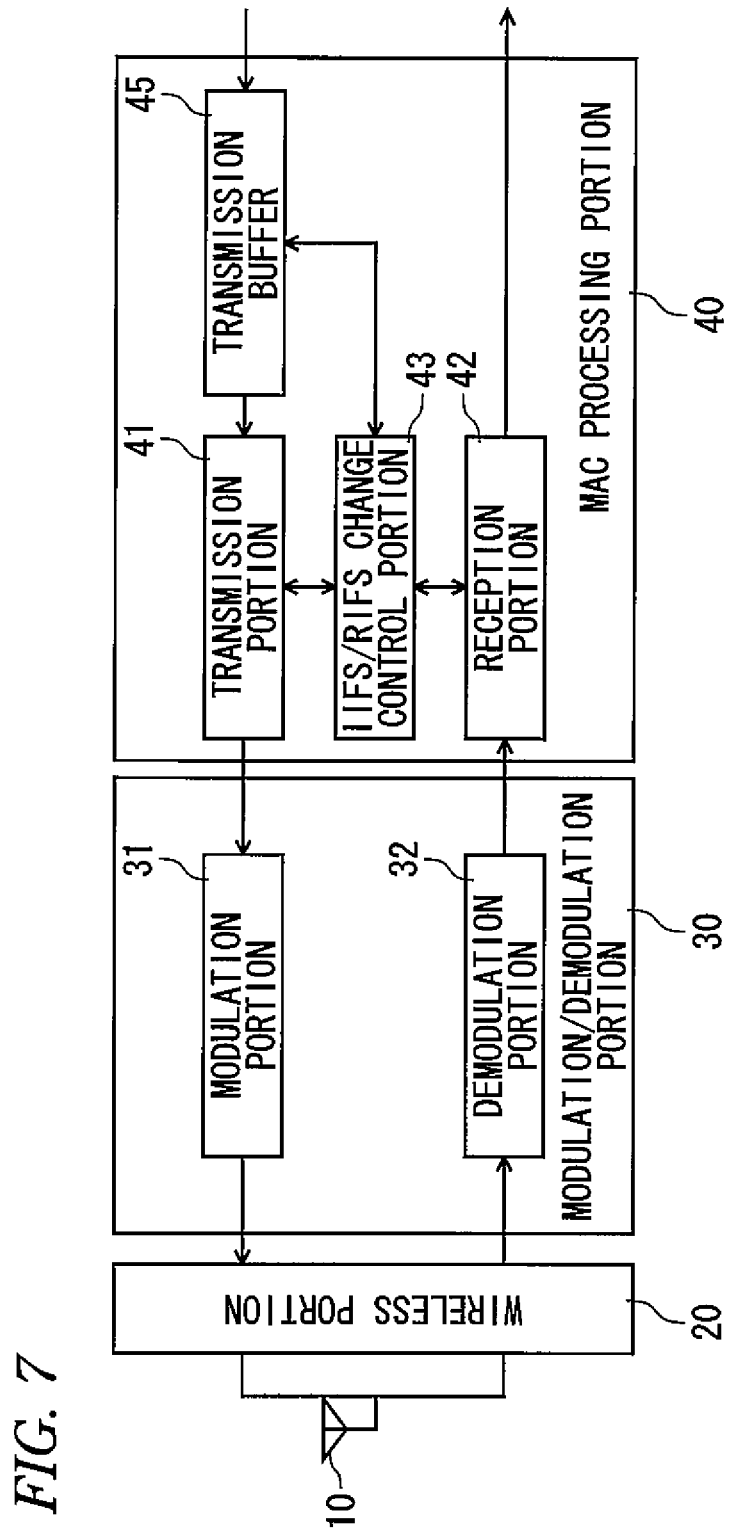
FIG. 7 is a diagram showing a wireless device according to Embodiment 1.

FIG. 7 shows a configuration example of a wireless device according to Embodiment 1. The first and second wireless devices 11 and 21 have different kinds and timings of signals to transmit, but can be implemented with the same hardware configuration. Therefore, both the first wireless device 11 and the second wireless device 21 will be described with reference to FIG. 7.

The wireless device in FIG. 7 has an antenna 10, a wireless portion 20, a modulation/demodulation portion 30 and a MAC processing portion 40. The modulation/demodulation portion 30 includes a modulation portion 31 and a demodulation portion 32. The MAC processing portion 40 includes a transmission portion 41, a reception portion 42, an IIFS/RIFS change control portion 43 and a transmission buffer 45 (transmission queue).

First, the operation of the wireless device at the time of signal transmission will be described. At the time of signal transmission, data outputted from a not-shown processing portion in a higher-level layer is stored into the transmission buffer 45. The transmission buffer 45 inputs buffered data into the transmission portion 41 in the order of storing. The transmission portion 41 performs processing such as addition of a MAC header to generate a frame. The generated frame is outputted to the modulation portion 31. The modulation portion 31 performs processing on the frame, such as encoding processing, modulation processing, addition of a physical header, etc. to generate a physical frame. The wireless portion 20 performs processing on the physical frame, such as D/A conversion processing, up-conversion, etc. to generate a transmission signal, which is transmitted through the antenna 10. Although the block for performing processing such as addition of a MAC header to generate a frame is referred to as a transmission portion in FIG. 7, the transmission portion 41, the modulation portion 31 and a portion of the wireless portion 20 having a transmission function in FIG. 7 may be referred to as a transmission portion or a transmitter as a whole.

Next, the operation of the wireless device at the time of signal reception will be described. A reception signal received through the antenna 10 is subjected to processing such as down-conversion, A/D conversion, etc. and converted into a physical frame by the wireless portion 20. The demodulation portion 32 performs processing on the physical frame, such as demodulation processing, analysis of a physical header, etc. to generate a frame. The reception portion 42 performs processing such as analysis of a MAC header of the frame to generate data. The reception portion 42 outputs the data to a processing portion in a higher-level layer when the reception signal is a signal transmitted from a communication partner of the wireless device. Although the block for performing processing such as analysis of a MAC header etc. to generate data is referred to as a reception portion in FIG. 7, the reception portion 42, the demodulation portion 32 and a portion of the wireless portion 20 having a reception function in FIG. 7 may be referred to as a reception portion or a receiver as a whole.

The first wireless device 11 in which the wireless device in FIG. 7 operates as an Initiator transmits a connection request signal to the second wireless device 21 which is another wireless device. On establishing connection with the second wireless device 21, the first wireless device 11 first transmits a first signal to the second wireless device 21 at a first interval IIFS and receives a signal from the second wireless device 21 at a second interval RIFS which is longer than the first interval IIFS.

The IIFS/RIFS change control portion 43 of the first wireless device 11 functions as a first determinator for determining whether there is a first signal (transmission data) to transmit to the second wireless device 21 or not.

The transmission portion 41 functions as a first transmitter for transmitting an end-of-transmission notification indicating that there is no signal to transmit, when the IIFS/RIFS change control portion 43 concludes that there is no first signal to transmit to the second wireless device 21, for example, upon a request from the IIFS/RIFS change control portion 43 to transmit end-of-transmission notification.

The reception portion 42 functions as a first receiver for receiving a change request notification, which makes a request to change the transmission interval of the first wireless device 11 from the first interval to the second interval, from the second wireless device 21 which has received the end-of-transmission notification. Incidentally, the change request notification may be a request to change the transmission interval of the second wireless device 21 from the second interval to the first interval.

When data to transmit occurs in the first wireless device 11 when the transmission interval of the transmission portion 41 is the second interval, the IIFS/RIFS change control portion 43 determines whether to change the transmission from the second interval to the first interval or not.

When the IIFS/RIFS change control portion 43 concludes that the transmission interval has to be changed to the first interval, the transmission portion 41 transmits a second change request notification indicating that the transmission interval will be changed.

When the second wireless device 21 in which the wireless device in FIG. 7 operates as a Responder receives a connection request signal from the first wireless device 11, which is another wireless device, and establishes connection with the first wireless device 11, the second wireless device 21 transmits a data signal to the first wireless device 11 at the second interval RIFS and receives a data signal from the first wireless device 11 at the first interval IIFS which is shorter than the second interval RIFS.

The IIFS/RIFS change control portion 43 functions as a second determinator for determining whether to make a request to change the transmission interval of the first wireless device 11 from the first interval to the second interval or not.

The reception portion 42 functions as a second receiver for receiving an end-of-transmission notification transmitted by the first wireless device 11.

The transmission portion 41 functions as a second transmitter for transmitting a change request notification to the first wireless device 11 when the reception portion 42 receives the end-of-transmission notification and the IIFS/RIFS change control portion 43 concludes that a request to change the interval from the first interval to the second interval has to be made.

When the reception portion 42 receives the second change request notification while the transmission 41 is transmitting a second signal (transmission data) at the first interval, the transmission portion 41 changes the transmission interval to the second interval in spite of existence of the second signal to transmit next.

As described above, in the wireless system according to Embodiment 1, when the first wireless device 11 which is an Initiator has no transmission data but the second wireless device 21 has transmission data, the transmission interval of the first wireless device 11 is changed to the second interval RIFS and the transmission interval of the second wireless device 21 is changed to the first interval IIFS. The transmission intervals are changed complementarily between IIFS and RIFS in accordance with existence of transmission data so that efficiency of Responder's signal transmission can be improved while Initiator's preferential transmission is secured. Further, when transmission data occurs in the first wireless device 11 as the Initiator, the transmission interval of the first wireless device 11 is changed to the first interval IIFS and the transmission interval of the second wireless device 21 is changed to the second interval RIFS regardless of the transmission condition of the second wireless device 21. Thus, Initiator's preferential transmission can be secured.

In the above description, it is assumed that the first wireless device 11 is an Initiator and the second wireless device 21 is a Responder. However, the first wireless device 11 may be a Responder, and the second wireless device 21 may be an Initiator. The way to decide the Initiator and the Responder may be a method in which one which has transmitted a connection request signal is regarded as the Initiator or a method in which the first and second wireless devices 11 and 21 make data exchange to determine which to serve as the Initiator or the Responder after the connection has been established by transmission and reception of the connection request signal. Each of the first and second wireless devices 11 and 21 has a not-shown storage area for holding information indicating that the wireless device itself is an Initiator or a Responder when the connection between the first and second wireless devices 11 and 21 has been established.

Although, in Embodiment 1, the second wireless device 21 transmits a change request notification after receiving an end-of-transmission notification from the first wireless device 11, the second wireless device 21 may add a change request notification to every data to transmit and transmit the data after concluding that the transmission interval has to be changed. In this case, the second wireless device 21 may change the transmission interval from RIFS to IIFS upon reception of an end-of-transmission notification after transmitting the change request notification. That is, when a change request notification has been already transmitted, the second wireless device 21 changes the transmission interval without transmitting another change request notification after receiving an end-of-transmission notification. When the first wireless device 11 transmits an end-of-transmission notification after receiving a change request notification, the first wireless device 11 changes the transmission interval from IIFS to RIFS without receiving another change request notification after that.

Embodiment 2

Embodiment 2 will be described. The case where setting is changed between IIFS and RIFS without consideration of the condition about whether a signal transmitted immediately before the change of the setting between IIFS and RIFS has arrived or not is shown in Embodiment 1. In fact, if transmission/reception of the most recently transmitted signal is not successful, the signal has to be re-transmitted. Therefore, the setting between IIFS and RIFS had better be changed after all the required transmissions including the re-transmission have been completed. For example, assume that a single data signal is transmitted for transmission of one data in one physical frame and a response signal such as an ACK signal corresponding to the transmitted single data signal is received. In this case, no response signal is transmitted when the transmitted signal is erroneous. Therefore, the setting between IIFS and RIFS is changed only when signal transmission is successful. On the other hand, assume that a multi-data signal is transmitted for transmission of a plurality of data in one physical frame. In this case, the transmission of all the data is not always completely successful even when a response signal such as a Block ACK (BA) signal is received. In Embodiment 2, therefore, description will be made on a method for changing the setting in consideration of occurrence of re-transmission in a wireless device whose interval has been set as IIFS. Specifically, in Embodiment 2, the timing when the setting between IIFS and RIFS is changed and the trigger with which the setting is changed are different from those in the description of Embodiment 1.

A wireless system according to Embodiment 2 has a first wireless device 12 and a second wireless device 22. The first wireless device 12 has substantially the same configuration and function as the first wireless device 11 in Embodiment 1, except the point that the first signal is a multi-data signal and the Ack signal is a Block Ack signal corresponding to a plurality of data and the point that a change permission notification is transmitted when a multi-data signal does not have to be re-transmitted. The second wireless device 22 has substantially the same configuration and function as the second wireless device 21 in Embodiment 1, except the point that the second signal is a multi-data signal and the Ack signal is a Block Ack signal corresponding to a plurality of data and the point that a second change permission notification is transmitted when a multi-data signal does not have to be re-transmitted. The following description will be made in the case where the first wireless device 12 operates as an Initiator and the second wireless device 22 operates as a Responder.

Figure 8:
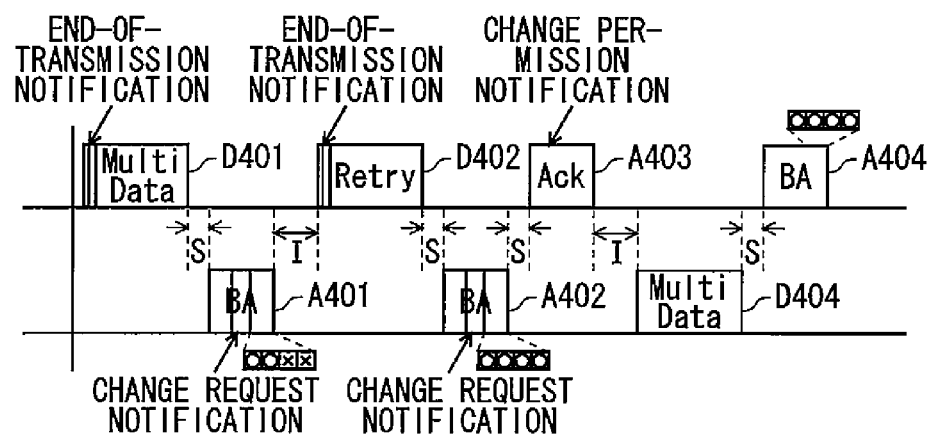
FIG. 8 is a view showing an example of packet exchange of a wireless system according to Embodiment 2.

FIG. 8 shows an example of packet exchange between the first and second wireless devices 12 and 22. The operation until the first and second wireless devices 12 and 22 establish connection is the same as that in Embodiment 1, and description thereof will be omitted. The first wireless device 12 transmits a multi-data signal D401 to the second wireless device 22.

On receiving the multi-data signal D401, the second wireless device 22 determines whether the second wireless device 22 is successful in receiving a plurality of data included in the multi-data signal D401 or not. The second wireless device 22 transmits arrival confirmation information corresponding to each of the plurality of data as a Block Ack signal (BA signal) A401. In the example of FIG. 8, four data are included in the multi-data signal D401 transmitted by the second wireless device 22, and the second wireless device 22 is successful in receiving the first and second data but has failed in receiving the third and fourth data. Therefore, the second wireless device 22 transmits the BA signal A401 indicating that fact.

The first wireless device 12 receiving the BA signal A401 transmits a re-transmission signal D402 including the third and fourth data which the second wireless device 22 has failed in receiving. On receiving the re-transmission signal D402, the second wireless device 22 transmits a BA signal A402 corresponding to the re-transmission signal D402. In the example of FIG. 8, the second wireless device 22 is successful in receiving all the data normally. Therefore, the second wireless device 22 transmits the BA signal A402 indicating that fact.

Here, an end-of-transmission notification is included in the multi-data signal D401 transmitted by the first wireless device 12. The multi-data signal D401 including the end-of-transmission notification may be generated in the same manner as transmission data including an end-of-transmission notification shown in Embodiment 1. In order to change the transmission interval from RIFS to IIFS, the second wireless device 22 receiving the multi-data signal D401 including the end-of-transmission notification adds a change request notification to the BA signal A401 and transmits the BA signal A401. The change request notification may be added to the BA signal A401 in the same manner as a change request notification added to an Ack signal in Embodiment 1.

However, information indicating a failure in reception is also included in the BA signal A401 transmitted by the second wireless device 22. Therefore, when the transmission interval of the second wireless device 22 is changed to IIFS immediately after transmitting a change request notification in the same manner as in Embodiment 1, the second wireless device 22 cannot receive the re-transmission signal D402. According to Embodiment 2, therefore, the transmission interval of the second wireless device 22 is changed to IIFS not immediately after transmitting a change request notification but after receiving a change permission notification in response to the change request notification.

In FIG. 8, the first wireless device 12 transmits not the change permission notification but the re-transmission signal D402 after the second wireless device 22 transmits the BA signal A401. Therefore, the second wireless device 22 does not change the transmission interval from RIFS to IIFS even after transmitting the BA signal A401 including the change request notification.

Due to the existence of the re-transmission signal D402, the first wireless device 12 does not transmit a change permission notification even after receiving the change request notification from the second wireless device 22. There may be no other data to transmit than the re-transmission signal D402 when the first wireless device 12 transmits the re-transmission signal D402. In this case, the first wireless device 12 adds an end-of-transmission notification to the re-transmission signal D402 and transmits the re-transmission signal D402.

On receiving the re-transmission signal D402, the second wireless device 22 transmits a BA signal A402 corresponding to the re-transmission signal D402. When the second wireless device 22 makes a request to change the transmission interval on this occasion, the second wireless device 22 transmits the BA signal A402 to which a change request notification is added.

The first wireless device 12 receives the BA signal A402. Since the second wireless device 22 is successful in receiving all the plurality of data included in the re-transmission data D402, the first wireless device 12 does not have to transmit another re-transmission signal. Accordingly, the first wireless device 12 transmits a change permission to the second wireless device 22 in response to the change request notification so as to permit the second wireless device 22 to change the transmission interval. In FIG. 8, an Ack signal A403 is transmitted in response to the BA signal A402 so as to provide a change permission. The transmission of the Ack signal A403 as a change permission notification may be replaced by transmission of another signal.

The first wireless device 12 transmitting the Ack signal A403 changes the transmission interval from IIFS to RIFS. On receiving the Ack signal A403, the second wireless device 22 changes the transmission interval from RIFS to IIFS and transmits data D404.

Figure 9:
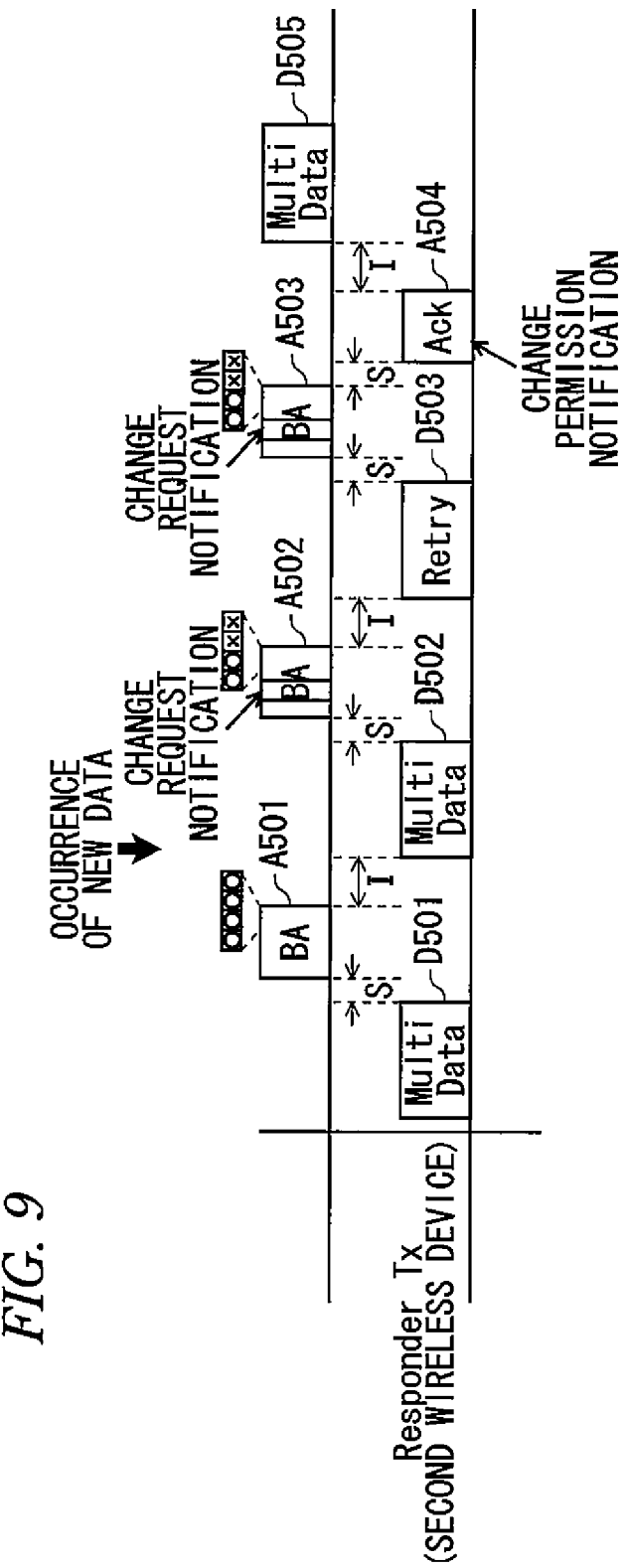
FIG. 9 is a view showing another example of packet exchange of the wireless system according to Embodiment 2.

Next, a case where the first wireless device 12 changes the transmission interval from RIFS to IIFS will be described with reference to FIG. 9. Here, assume that communication is made between the first wireless device 12 whose transmission interval is RIFS and the second wireless device 22 whose transmission interval is IIFS.

Consider a case where data to transmit occurs in the first wireless device 12 when the second wireless device 22 has transmitted a multi-data signal D501 and the first wireless device 12 is transmitting a BA signal A501 corresponding to the multi-data signal D501.

In this case, the first wireless device 12 transmits a change request notification at a next timing of transmitting a signal to the second wireless device 22, regardless of the transmission condition of the second wireless device 22. In FIG. 9, the first wireless device 12 adds the change request notification to a BA signal A502 corresponding to a multi-data signal D502, and transmits the BA signal A502.

However, the first wireless device 12 has failed in receiving the third and fourth data of a plurality of data included in the multi-data signal D502. Information indicating the failure in reception is included in the BA signal A502 transmitted by the first wireless device 12. Accordingly, the second wireless device 22 transmits a re-transmission signal of the multi-data signal D502. If the first wireless device 12 changes the transmission interval to IIFS, the first wireless device 12 cannot receive the re-transmission signal. Therefore, the second wireless device 22 transmits a re-transmission signal D503 without transmitting a change permission notification.

The first wireless device 12 which has transmitted the change request notification has not received the change permission notification. Therefore, the first wireless device 12 does not change the transmission interval from RIFS to IIFS but receives the re-transmission signal D503. Due to occurrence of data to transmit, the first wireless device 12 adds a change request notification to the BA signal A503 in response to the re-transmission signal D503 and transmits the BA signal A503.

In this case, the first wireless device 12 is successful in receiving all the data included in the re-transmission signal D503. Accordingly, the second wireless device 22 transmits a change permission notification even when there is some data to transmit in the transmission queue. FIG. 9 shows that an Ack signal A504 is transmitted in response to the BA signal A503 to provide change permission. The transmission of the Ack signal A504 as a change permission notification may be replaced by transmission of another signal.

The second wireless device 22 which has transmitted the Ack signal A504 changes the transmission interval from IIFS to RIFS. On receiving the Ack signal A504, the first wireless device 12 changes the transmission interval from RIFS to IIFS and transmits data D505.

Figure 10:
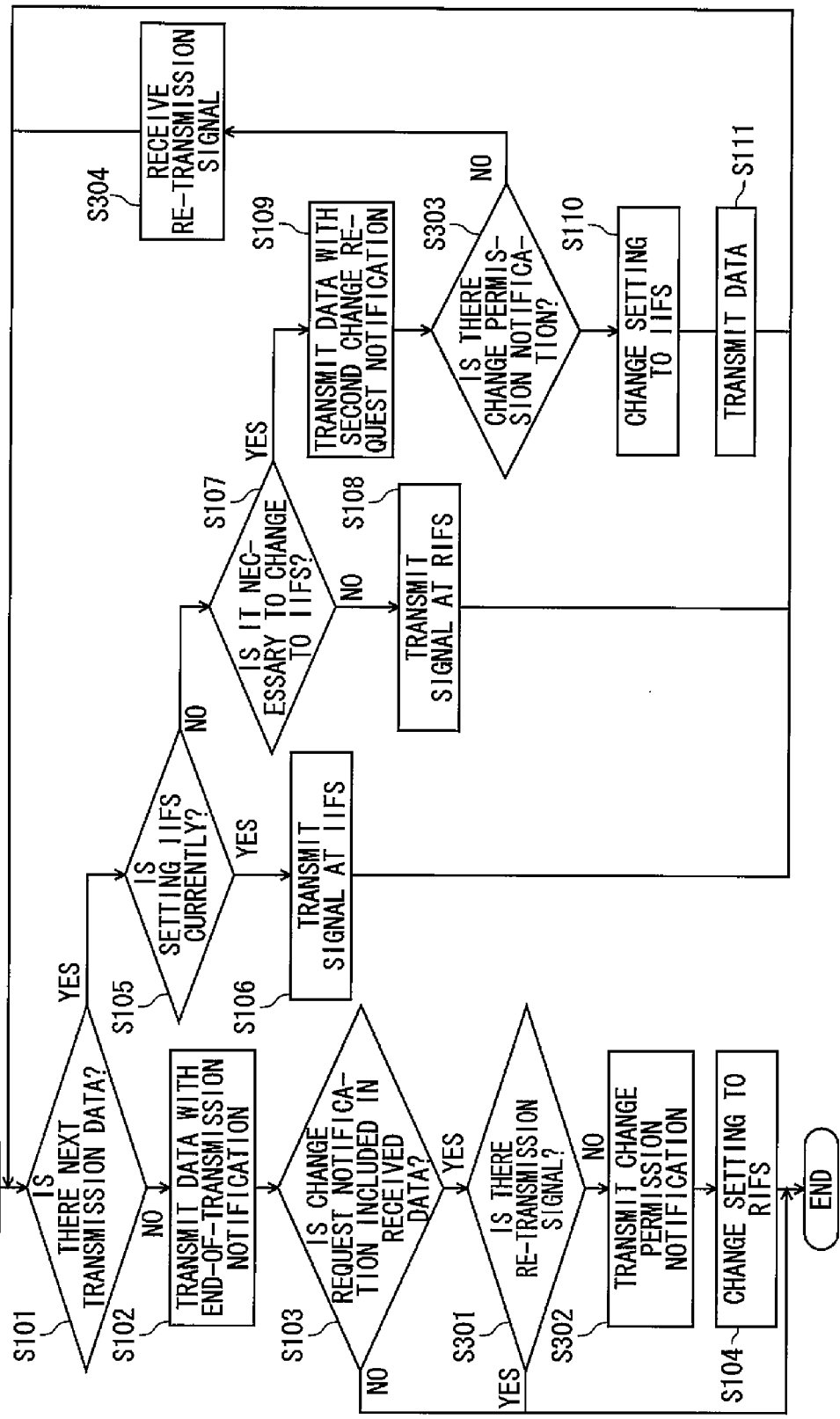
FIG. 10 is a chart showing a processing flow of a first wireless device 12 according to Embodiment 2.

FIG. 10 shows a flow of processing in the first wireless device 12. On receiving a change request notification from the second wireless device 22, the first wireless device 12 determines whether re-transmission of a multi-data signal is necessary or not (S301). When re-transmission is necessary (Yes in S301), the first wireless device 12 terminates processing and transmits a re-transmission signal at the transmission interval IIFS. On the contrary, when re-transmission is not necessary (No in S301), the first wireless device 12 transmits a change permission notification (S302) and changes the transmission interval from IIFS to RIFS (S104).

In addition, in order to change the transmission interval of the first wireless device 12 from RIFS to IIFS, the first wireless device 12 transmits a second change request notification to the second wireless device 22 (S109). When the first wireless device 12 does not receive the change permission notification from the second wireless device 22 (No in S303), the first wireless device 12 does not change the transmission interval but receives the re-transmission signal (S304) and returns to S101. On the contrary, when the first wireless device 12 receives the change permission notification from the second wireless device 22 (Yes in S303), the first wireless device 12 changes the transmission interval from RIFS to IIFS (S110), transmits a multi-data signal (S111) and returns to S101.

Figure 11:
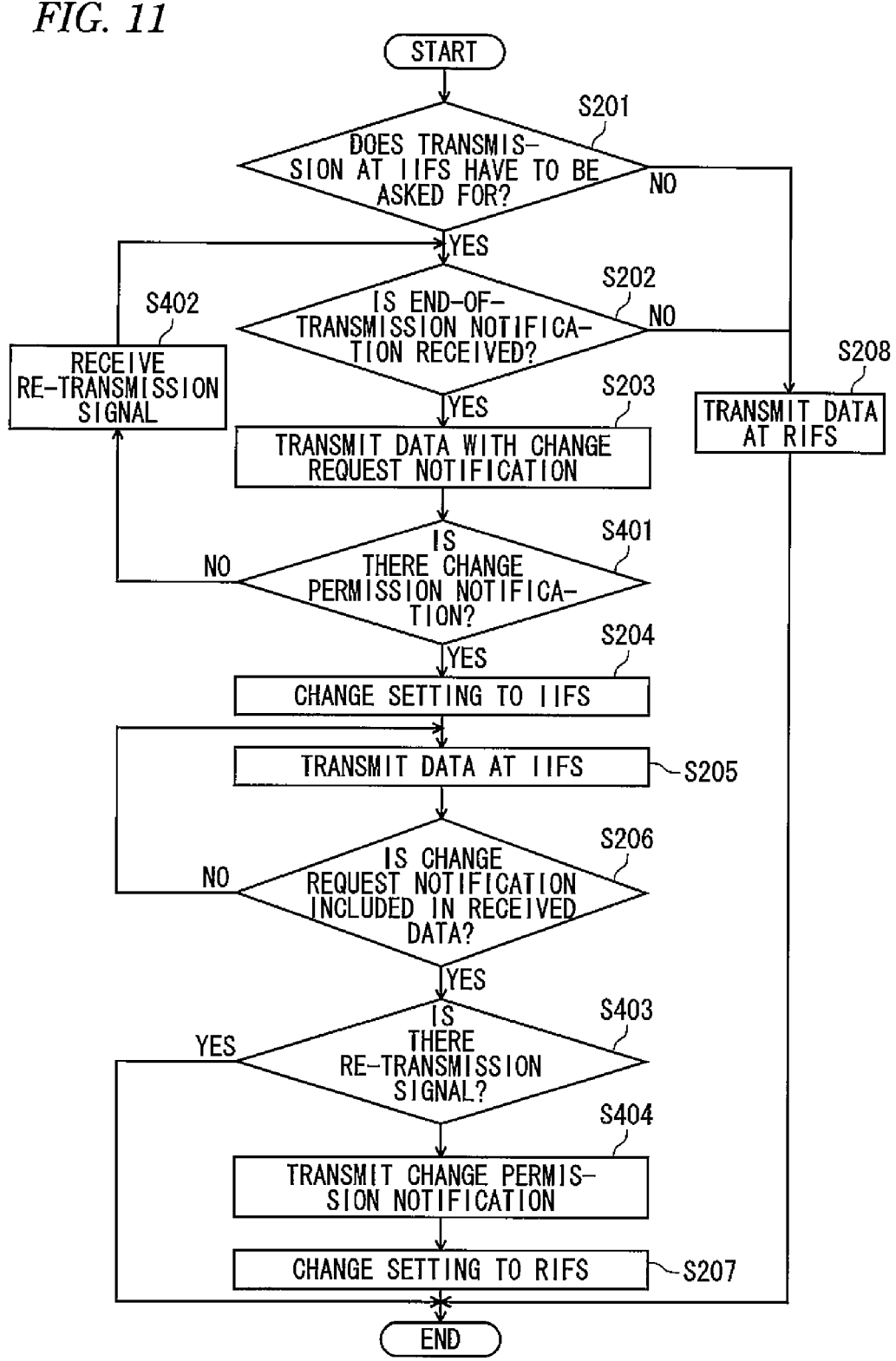
FIG. 11 is a chart showing a processing flow of a second wireless device 22 according to Embodiment 2.

FIG. 11 shows a flow of processing in the second wireless device 22. In order to change the transmission interval from RIFS to IIFS, the second wireless device 22 transmits a change request notification to the first wireless device 12 (S203). After transmitting the change request notification, the second wireless device 22 determines whether a change permission notification has been received or not (S401). When the change permission notification has not been received (No in S401), the second wireless device 22 receives a re-transmission signal (S402) and returns to S202. On the contrary, when the change permission notification has been received (Yes in S401), the second wireless device 22 changes the transmission interval from RIFS to IIFS (S204).

On receiving a second change request notification from the first wireless device 12 (Yes in S206) when the second wireless device 22 is transmitting a multi-data signal at the transmission interval IIFS, the second wireless device 22 determines whether re-transmission of the transmitted multi-data signal is necessary or not (S403). When the re-transmission is necessary (Yes in S403), the second wireless device 22 terminates processing and transmits a re-transmission signal. On the contrary, when the re-transmission is not necessary (No in S403), the second wireless device 22 transmits a change permission notification (S404) and changes the transmission interval from IIFS to RIFS (S207).

Figure 12:
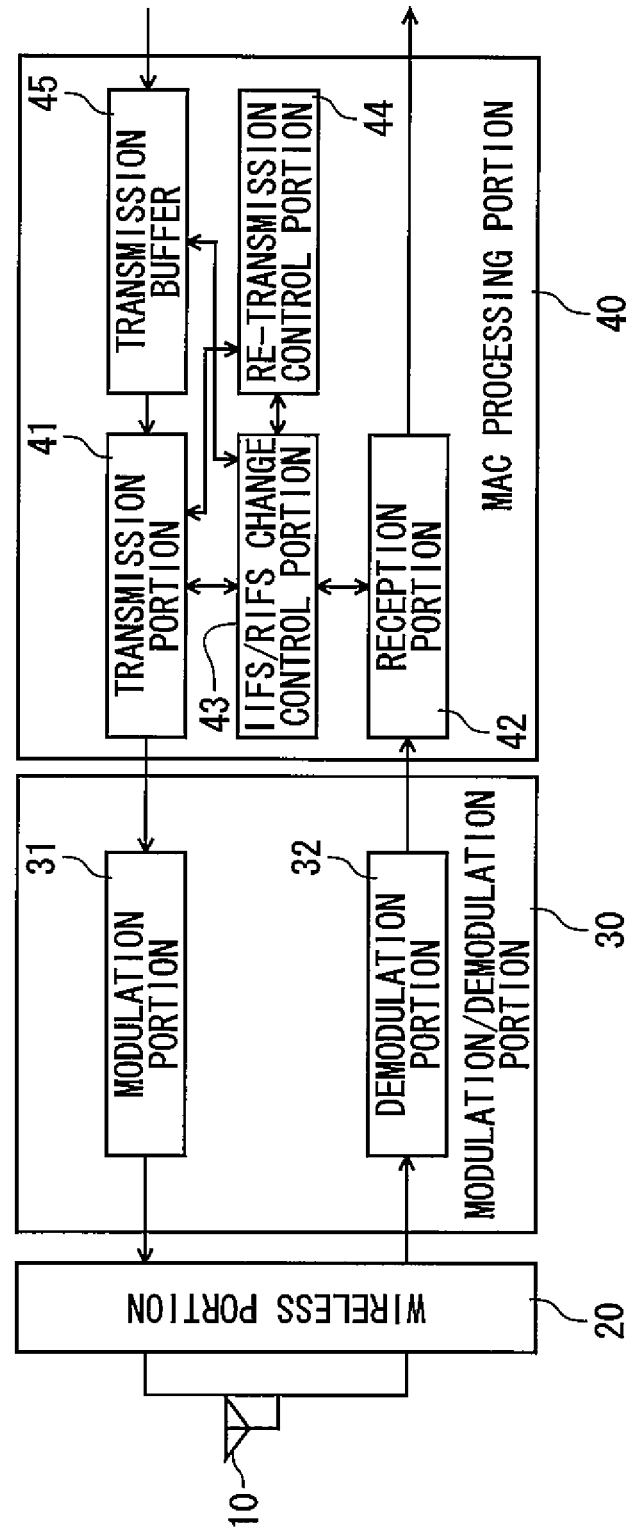
FIG. 12 is a diagram showing a wireless device according to Embodiment 2.

FIG. 12 shows a configuration example of a wireless device according to Embodiment 2. The first and second wireless devices 12 and 22 have different kinds and timings of signals to transmit, but can be implemented with the same hardware configuration. Therefore, both the first wireless device 12 and the second wireless device 22 will be described with reference to FIG. 12.

The wireless device in FIG. 12 has a re-transmission control portion 44 in addition to the configuration of the wireless device in FIG. 7.

The re-transmission control portion 44 controls re-transmission of a multi-data signal in accordance with a BA signal transmitted by another wireless device which is a communication partner. The re-transmission control portion 44 controls the transmission portion 41 to re-transmit data whose transmission has failed. The transmission portion 41 transmits a re-transmission signal in accordance with an instruction from the re-transmission control portion 44.

When a change request notification is received from the second wireless device 22 by the first wireless device 12 in which the wireless device in FIG. 12 operates as an Initiator, the IIFS/RIFS change control portion 43 of the first wireless device 12 sends an inquiry to the re-transmission control portion 44 as to whether re-transmission is necessary or not. When re-transmission is not necessary, the IIFS/RIFS change control portion 43 concludes that the transmission interval has to be changed from IIFS to RIFS.

When the IIFS/RIFS change control portion 43 concludes that the transmission interval has to be changed from IIFS to RIFS, that is, when there is no first signal (multi-data signal) to re-transmit when the reception portion 42 receives a change request notification, the transmission portion 41 serving as a first transmitter transmits a change permission notification to change the transmission interval of the first wireless device from the first interval IIFS to the second interval RIFS, changes the transmission interval to the second interval and transmits the first signal (multi-data signal) at the second interval.

When data to transmit occurs in the first wireless device 12 when the transmission interval of the transmission portion 41 is the second interval, the IIFS/RIFS change control portion 43 determines whether to change the transmission interval from the second interval to the first interval or not.

When the IIFS/RIFS change control portion 43 concludes that the transmission interval has to be changed to the first interval, the transmission portion 41 transmits a second change request notification indicating that the transmission interval will be changed.

When a change permission notification is received from the second wireless device 22 after the second change request notification is transmitted, the IIFS/RIFS change control portion 43 changes the transmission interval from RIFS to IIFS.

In the second wireless device 22 in which the wireless device in FIG. 12 operates as a Responder, the IIFS/RIFS change control portion 43 of the second wireless device 22 changes the transmission interval from RIFS to IIFS when the reception portion 42 receives a change permission notification after the transmission portion 41 transmits a change request notification.

When the IIFS/RIFS change control portion 43 changes the transmission interval, the transmission portion 41 transmits a second signal (multi-data signal) at the transmission interval IIFS.

In addition, on receiving a second change request notification from the first wireless device 12, the IIFS/RIFS change control portion 43 does not transmit a change permission notification when there is a second signal (multi-data signal) to be re-transmitted by the re-transmission control portion 44, and changes the transmission interval from IIFS to RIFS in spite of existence of data to be transmitted by the second wireless device 22 when there is no signal to be re-transmitted. When the IIFS/RIFS change control portion 43 changes the transmission interval, the transmission portion 41 transmits a change permission notification to the first wireless device 12 and transmits the second signal at RIFS after that.

As described above, in the wireless system according to Embodiment 2, a similar effect to that in Embodiment 1 can be obtained. In addition, the transmission interval is changed only when there is no re-transmission signal. Therefore, even if transmission of a transmission signal fails, a re-transmission signal can be transmitted without delay.

Modification 1

Figure 13:
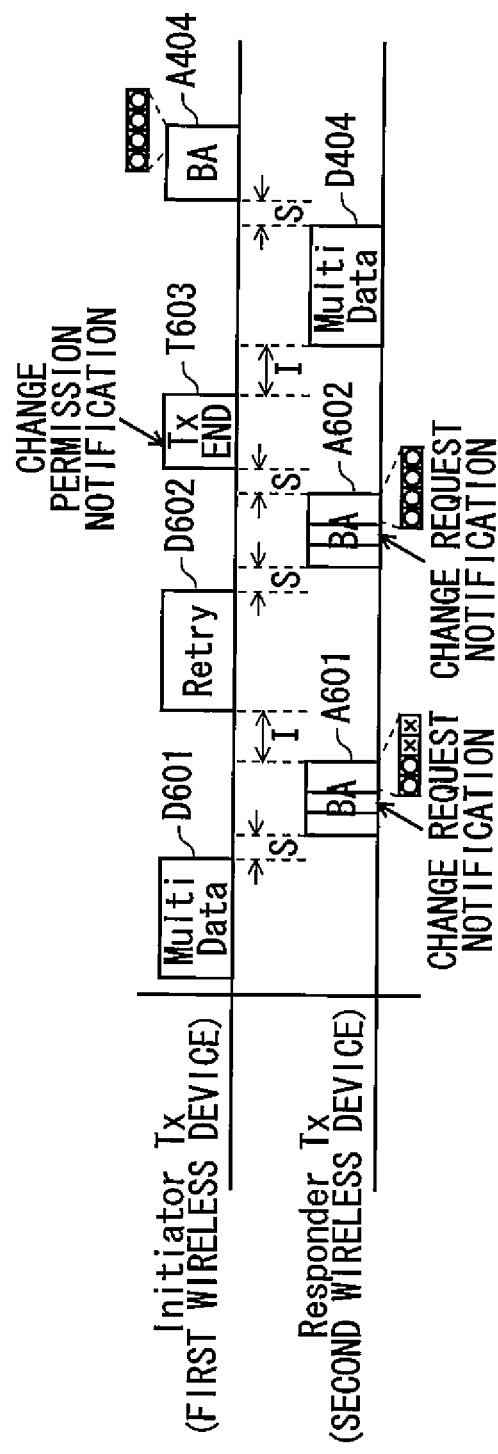
FIG. 13 is a view showing an example of packet exchange of a wireless system according to Modification 1 of Embodiment 2.

A modification of Embodiment 2 will be described with reference to FIG. 13. In Embodiment 2, when the first wireless device 12 transmits an end-of-transmission notification, the second wireless device 22 transmits a change request notification. When the first wireless device 12 transmits a change permission notification in response to the change request notification, the first wireless device 12 changes the transmission interval from IIFS to RIFS while the second wireless device 22 changes the transmission interval from RIFS to IIFS. In this Modification 1, the second wireless device 22 transmits a change request notification in spite of absence of an end-of-transmission notification transmitted by the first wireless device 12 when the second wireless device 22 concludes that the transmission interval has to be changed. On receiving a change request notification from the second wireless device 22, the first wireless device 12 transmits a change permission notification when there is no data and no re-transmission signal to be transmitted next.

Specific description will be made with reference to FIG. 13. The first wireless device 12 transmits a multi-data signal D601. In spite of absence of data to transmit after transmitting the multi-data signal D601, the first wireless device 12 transmits the multi-data signal D601 to which an end-of-transmission notification is not added.

On receiving the multi-data signal D601, the second wireless device 22 transmits a BA signal A601 corresponding to the multi-data signal D601 to the first wireless device 12. The second wireless device 22 adds a change request notification to the BA signal A601 and transmits the BA signal A601 in order to change the transmission interval from RIFS to IIFS.

The first wireless device 12 receives the BA signal A601 including the change request notification. Since the BA signal A601 indicates that reception of a part of data of the multi-data signal D601 is a failure, the first wireless device 12 does not transmit a change permission notification but transmits a re-transmission signal D602. Even when there is no other data to transmit than the re-transmission signal, the first wireless device 12 transmits the re-transmission signal D602 to which an end-of-transmission notification is not added.

On receiving the re-transmission signal D602, the second wireless device 22 transmits a BA signal A602 corresponding to the re-transmission signal D602 to the first wireless device 12. The second wireless device 22 adds a change request notification to the BA signal A602 and transmits the BA signal A602 in order to change the transmission interval from RIFS to IIFS.

The first wireless device 12 receives the BA signal A602 including the change request notification. Since the second wireless device 22 is successful in receiving the re-transmission signal D602 in this time, the first wireless device 12 does not have to re-transmit a multi-data signal. Therefore, the first wireless device 12 transmits a Tx End signal T603 as a change permission notification. For example, the change permission notification may be an Ack signal as in Embodiment 2, or another prepared signal.

On transmitting the Tx End signal T603, the first wireless device 12 changes the transmission interval from IIFS to RIFS. On receiving the Tx End signal T603, the second wireless device 22 changes the transmission interval from RIFS to IIFS and transmits a multi-data signal D404.

Embodiment 3

Embodiment 3 will be described. In Embodiment 2, a wireless device receiving a change request notification transmits a change permission notification in consideration of existence of a re-transmission signal. In Embodiment 3, a wireless device transmitting a change request notification transmits a signal at the second interval RIFS when the signal is a signal to transmit for the first time after transmitting the change request notification, and transmits a signal at the first interval IIFS when the signal is a signal to transmit on and after the second time. As a result, the wireless device can change the transmission interval from RIFS to IIFS without receiving a change permission notification.

A wireless system according to Embodiment 3 has a first wireless device 13 and a second wireless device 23. The first wireless device 13 has substantially the same configuration and function as the first wireless device 11 in Embodiment 1, except the point that the first signal is a multi-data signal and the Ack signal is a Block Ack signal corresponding to a plurality of data and the point of transmission interval of the first signal to be transmitted after transmission of a change request notification. The second wireless device 23 has substantially the same configuration and function as the second wireless device 21 in Embodiment 1, except the point that the second signal is a multi-data signal and the Ack signal is a Block Ack signal corresponding to a plurality of data and the point of the transmission interval of the second signal to be transmitted after transmission of a change request notification. The following description will be made in the case where the first wireless device 13 operates as an Initiator and the second wireless device 23 operates as a Responder.

Figure 14:
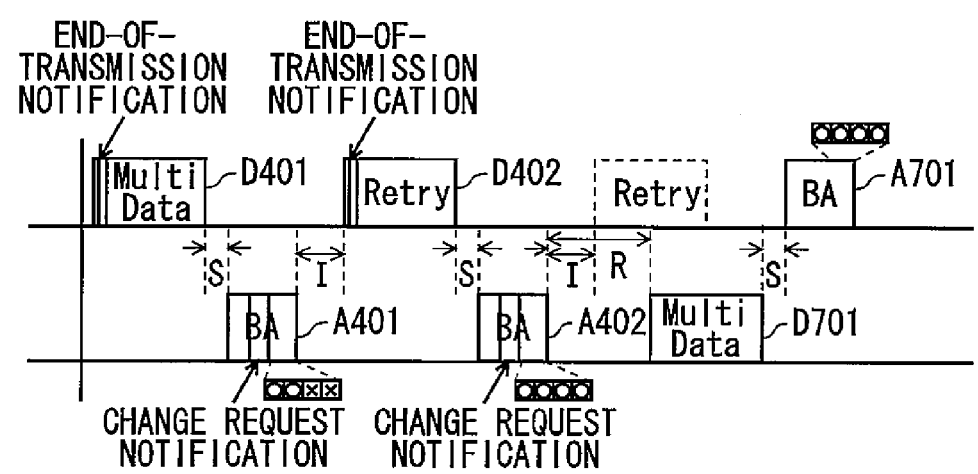
FIG. 14 is a view showing an example of packet exchange of a wireless system according to Embodiment 3.

FIG. 14 shows an example of packet exchange between the first and second wireless devices 13 and 23. The operation until the second wireless device 23 transmits a change request notification is the same as that in Embodiment 2, and description thereof will be therefore omitted.

The second wireless device 23 transmitting a BA signal A402 including a change request notification transmits a multi-data signal (second signal) D701 to transmit next to the BA signal A402, at an interval RIFS. When, for example, there is a re-transmission signal in the first wireless device 13 as shown by the broken line in FIG. 14, the first wireless device 13 transmits the re-transmission signal at an interval IIFS. Thus, the second wireless device 23 receives the re-transmission signal before transmitting the multi-data signal D701. As a result, there is no collision between the re-transmission signal transmitted by the first wireless device 13 and the multi-data signal transmitted by the second wireless device 23.

On the other hand, when there is no re-transmission signal in the first wireless device 13, the second wireless device 23 transmits the multi-data signal D701 at the transmission interval RIFS. When the second wireless device 23 transmits the multi-data signal D701 at the transmission interval RIFS, the second wireless device 23 transmits multi-data signals following the multi-data signal D701 at the transmission interval IIFS.

Since the case where the first wireless device 13 changes the transmission interval from RIFS to IIFS is similar to that in Embodiment 2, description thereof will be omitted.

Figure 15:
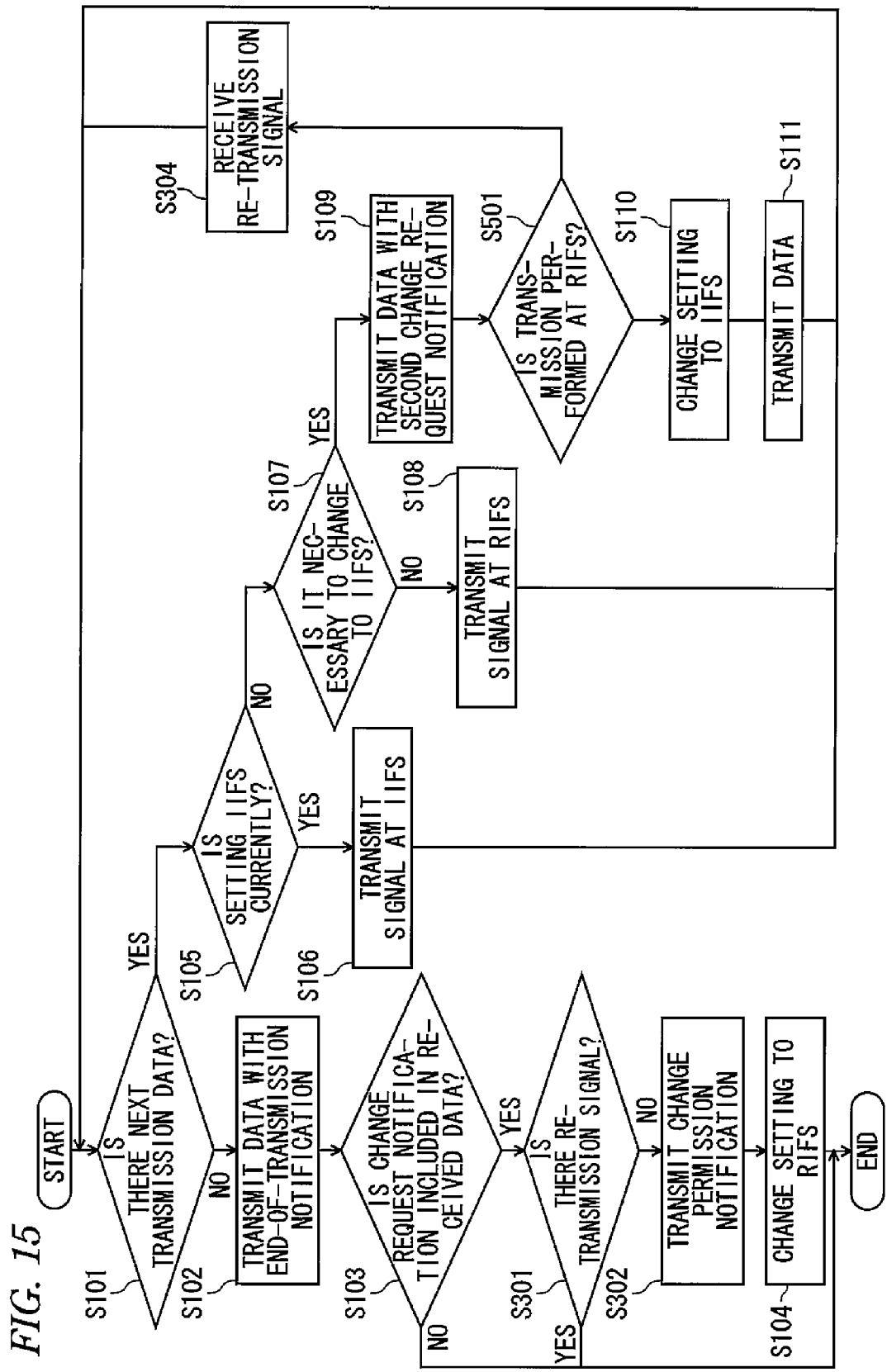
FIG. 15 is a chart showing a processing flow of a first wireless device 13 according to Embodiment 3.

FIG. 15 shows a flow of processing in the first wireless device 13. The flow of processing in FIG. 15 is different at the point that determination in S303 of FIG. 10 as to whether there is a change permission notification or not is replaced by determination as to whether signal transmission is performed at an interval RIFS (S501).

The configuration of each wireless device in Embodiment 3 is the same as that of the block diagram shown in FIG. 12. When the wireless device in FIG. 12 operates as a Responder in Embodiment 3, the transmission portion 41 transmits a first signal not at the transmission interval IIFS but at the transmission interval RIFS after transmitting a change request notification.

Thus, according to Embodiment 3, a similar effect to that in Embodiment 1 or Embodiment 2 can be obtained. In addition, the transmission interval can be changed without use of a change permission notification. Thus, the signal transmission efficiency can be improved further.

Modification 2

A modification of Embodiment 3 will be described with reference to FIG. 16. In Embodiment 3, the second wireless device 23 transmitting a change request notification waits for next RIFS and then transmits a next multi-data signal. In this modification, the second wireless device 23 checks the contents of a BA signal. Assume that the second wireless device 23 is successful in receiving a multi-data signal transmitted by the first wireless device 13 and concludes that a re-transmission signal will not be transmitted. In this case, the second wireless device 23 transmits a multi-data signal to transmit next to the transmission of a change request notification, at the transmission interval IIFS.

Specific description will be made with reference to FIG. 16. The part until the second wireless device 23 adds a change request notification to a BA signal A402 and transmits the BA signal A402 is the same as that in FIG. 8.

The second wireless device 23 is successful in receiving a re-transmission signal D402. The second wireless device 23 adds a change request notification to a BA signal A402 and transmits the BA signal A402. After transmitting the BA signal A402, the second wireless device 23 transmits a multi-data signal D801 at a transmission interval IIFS.

The configuration of the second wireless device 23 is the same as that of the block diagram shown in FIG. 12. The IIFS/RIFS change control portion 43 further has a function of determining whether reception of data transmitted by the first wireless device 13 is a success or not based on a notification received from the reception portion 42 or a notification received from the re-transmission control portion 44, and determining whether or not to transmit a multi-data signal at an interval IIFS after transmitting a BA signal including a change request notification.

Figure 16:
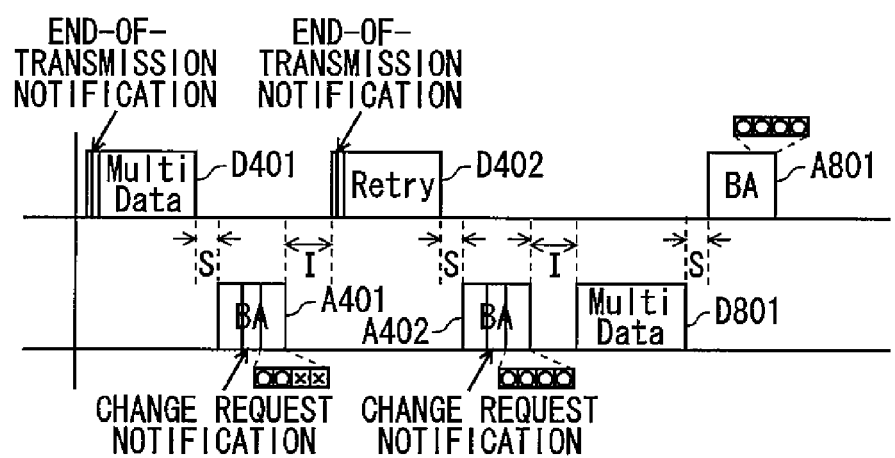
FIG. 16 is a chart showing an example of packet exchange of the wireless system according to Modification 2 of Embodiment 3.

Although the second wireless device 23 in FIG. 16 transmits a change request notification when concluding that the transmission interval has to be changed, the second wireless device 23 may transmit the change request notification only when the second wireless device 23 is successful in receiving data transmitted by the first wireless device 13. For example, the second wireless device 23 may add a change request notification not to the BA signal A401 but only to the BA signal A402 and transmit the BA signal A402.

In addition, although only the second wireless device 23 has been described in this modification, the first wireless device 13 may be modified in the same manner. In FIG. 9, the first wireless device adds a second change request notification to a BA signal and transmits the BA signal. Since the first wireless device is successful in receiving the re-transmission signal D503, the first wireless device does not receive a re-transmission signal in spite of transmission of the BA signal A503. Therefore, the first wireless device may transmit a multi-data signal D505 at the transmission interval IIFS after transmitting the BA signal A503.

The configuration of the first wireless device in this case is the same as that of the block diagram shown in FIG. 12. The IIFS/RIFS change control portion 43 further has a function of determining whether reception of data transmitted by the second wireless device 23 is a success or not based on a notification received from the reception portion 42 or a notification received from a re-transmission control portion 44, and determining whether or not to transmit a multi-data signal at an interval IIFS after transmitting a BA signal including a second change request notification.

The invention is not limited to the aforementioned embodiments and components may be modified without departing from the scope of the invention. For example, components the aforementioned embodiments may be combined suitably, some components may be removed from all components in each embodiment, and components in different embodiments may be combined suitably.

The invention claimed is:

1. A first wireless device for transmitting a first signal to a second wireless device at one of a first interval and a second interval, the second interval being longer than the first interval, and for receiving a second signal from the second wireless device at the other of the first interval and the second interval, the first wireless device comprising:
    a first connection establisher which establishes a wireless connection with the second wireless device;
    a first determinator which determines whether or not to transmit an end-of-transmission notification, wherein the end-of-transmission notification indicates that transmission data to be transmitted to the second wireless device does not exist currently;
    a first transmitter which transmits to the second wireless device: (i) the first signal through the established wireless connection at the first interval, and (ii) the end-of-transmission notification through the established wireless connection when the first determinator determines that the end-of-transmission notification is to be transmitted; and
    a first receiver which waits for a change request signal to be sent from the second wireless device through the established wireless connection in response to the transmission of the end-of-transmission notification, wherein the change request signal requests to change a transmission interval of the first wireless device from the first interval to the second interval,
    wherein after the first receiver receives the change request signal, the first transmitter performs a data transmission to the second wireless device at the second interval, and the first receiver performs a data reception from the second wireless device at the first interval, through the established wireless connection.

2. The device of claim 1, wherein the first determinator determines whether or not to transmit a second change request signal when the transmission data becomes available for transmission during the transmission of the first signal at the second interval, wherein the second change request signal requests to change the transmission interval of the first wireless device from the second interval to the first interval,
    wherein the first transmitter transmits the second change request signal to the second wireless device through the established wireless connection, when the first determinator determines that the second change request signal is to be transmitted.

3. The device of claim 2, wherein the first transmitter transmits a change permission signal to change the transmission interval of the first wireless device from the first interval to the second interval and transmits the first signal at the second interval in a case where the first transmitter does not have re-transmission data when the first receiver receives the change request signal.

4. The device of claim 1, further comprising a first antenna through which the first signal and the end-of-transmission notification are transmitted, and the second signal and the change request signal are received.

5. A second wireless device for receiving a first signal from a first wireless device at one of a first interval and a second interval, the second interval being longer than the first interval, and for transmitting a second signal to the first wireless device at the other of the first interval and the second interval, the second wireless device comprising:

a second connection establisher which establishes a wireless connection with the first wireless device;
a second determinator which determines whether or not to transmit a change request signal, wherein the change request signal requests to change a transmission interval of the first wireless device from the first interval to the second interval;
a second receiver which waits for an end-of-transmission notification from the first wireless device through the established wireless connection, wherein the end-of-transmission notification indicates that transmission data to be transmitted from the first wireless device does not exist currently; and
a second transmitter which transmits the change request signal to the first wireless device through the established wireless connection in response to receipt of the end-of-transmission notification, when the second determinator determines that the change request signal is to be transmitted,
wherein after the second transmitter transmits the change request signal, the second transmitter performs a data transmission to the first wireless device at the first interval, and the second receiver performs a data reception from the first wireless device at the second interval, through the established wireless connection.

6. The device of claim 5, wherein the second transmitter changes a transmission interval to the second interval even when transmission data exists after the second receiver receives a second change request signal, wherein the second change request signal requests to change the transmission interval of the first wireless device from the second interval to the first interval.

7. The device of claim 6, wherein the second transmitter, after transmitting the change request signal, transmits a first piece of the second signal at the second interval and second and subsequent pieces of the second signal at the first interval.

8. The device of claim 6, wherein the second transmitter transmits the second signal at the first interval after the second transmitter transmits the change request signal and the second receiver receives from the first wireless device a change permission signal to change the transmission interval of the first wireless device from the first interval to the second interval.

9. The device of claim 8, wherein after the second receiver receives the second change request signal, the second transmitter transmits a second change permission signal to change the transmission interval to the second interval even when the transmission data exists but as long as re-transmission data does not exist.

10. The device of claim 5, further comprising a second antenna through which the first signal and the end-of-transmission notification are received, and the second signal and the change request signal are transmitted.

11. A method of a first wireless device, for transmitting a first signal from the first wireless device to a second wireless device at one of a first interval and a second interval, the second interval being longer than the first interval, and for receiving a second signal from the second wireless device at the other of the first interval and the second interval, the method comprising:
establishing a wireless connection with the second wireless device;
determining whether or not to transmit an end-of-transmission notification, wherein the end-of-transmission notification indicates that transmission data to be transmitted to the second wireless device does not exist currently;
transmitting the first signal to the second wireless device through the established wireless connection at the first interval, and transmitting the end-of-transmission notification to the second wireless device through the established wireless connection when it is determined that the end-of-transmission notification is to be transmitted;
waiting for a change request signal to be sent from the second wireless device through the established wireless connection in response to the transmission of the end-of-transmission notification, wherein the change request signal requests to change a transmission interval of the first wireless device from the first interval to the second interval; and
upon receipt of the change request signal, performing a data transmission to the second wireless device at the second interval, and performing a data reception from the second wireless device at the first interval, through the established wireless connection.

12. A method of a second wireless device, for receiving a first signal from a first wireless device at one of a first interval and a second interval, the second interval being longer than the first interval, and for transmitting a second signal to the first wireless device at the other of the first interval and the second interval, the method comprising:
establishing a wireless connection with the first wireless device;
determining whether or not to transmit a change request signal, wherein the change request signal requests to change a transmission interval of the first wireless device from the first interval to the second interval;
waiting for an end-of-transmission notification from the first wireless device through the established wireless connection, wherein the end-of-transmission notification indicates that transmission data to be transmitted from the first wireless device does not exist currently;
transmitting the change request signal to the first wireless device through the established wireless connection in response to receipt of the end-of-transmission notification, when it is determined that the change request signal is to be transmitted; and
upon transmission of the change request signal, performing a data transmission to the first wireless device at the first interval, and performing a data reception from the first wireless device at the second interval, through the established wireless connection.

* * * * *